United States Patent Office 3,319,508
Patented May 16, 1967

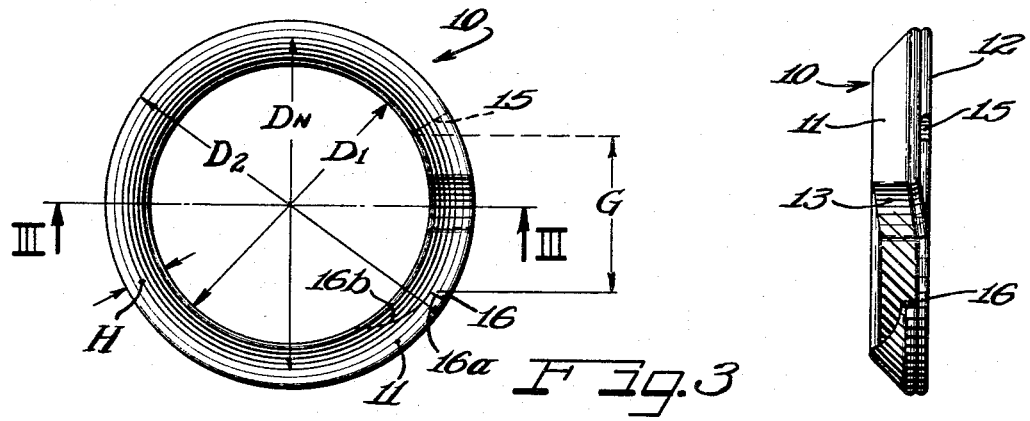
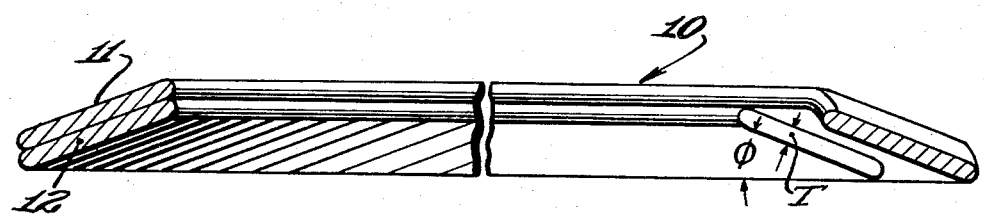
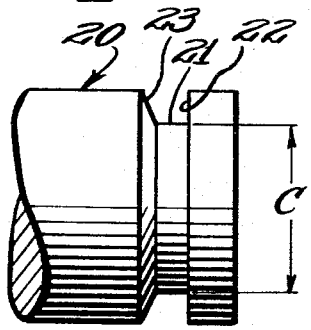
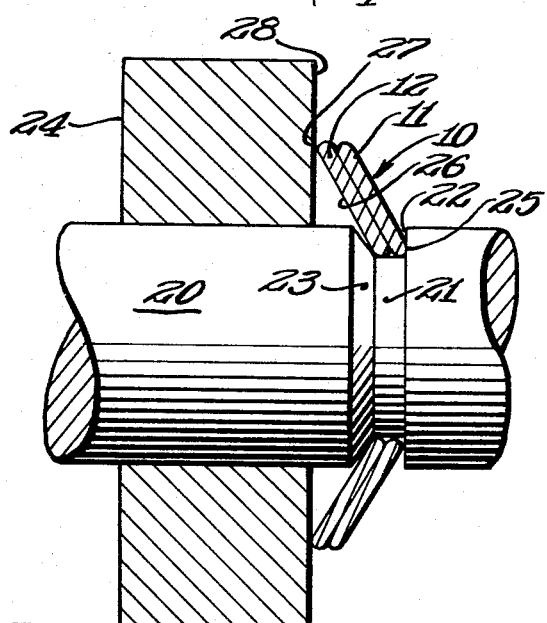

3,319,508
RESILIENT RETAINING RING
Harold E. McCormick, Brentwood, Mo., assignor to Ramsey Corporation, St. Louis, Mo., a corporation of Ohio
Filed May 8, 1964, Ser. No. 365,906
3 Claims. (Cl. 85—8.8)

This invention relates to a resilient retaining ring, and more particularly to a resilient retaining ring of flat strip material coiled upon itself and permanently dished to a substantially frusto-conical shape.

Retaining rings of various types have heretofore been used for association with grooved parts that are relatively movable axially of each other in order to limit or restrain the extent of such relative axial movement. In using a conventional design of a flat retaining ring, or snap ring, it is necessary to leave at least a small clearance between the retaining ring and the retained part in order to insure ease of installation. If the retained part consists of an assembly, there is always the possibility that an accumulation of clearances may occur that would result in an excessively large clearance between the retained part and the retaining ring. Such large clearance can create noise or even permit the retained part to move excessively, thereby causing improper functioning of the overall assembly.

To overcome these problems, prior workers in the field have used interspaced, waved, bowed or dished washers, such as the Belleville washer, between the retained part and the retaining ring. However, these washers involve a two-piece assembly, with resulting higher cost of manufacture. Another type of retaining ring is that disclosed in the Frisby Patent No. 2,660,913. The retaining ring disclosed in that patent comprises two annular coils of conical form having an angle not less than 30° and not more than 70° to the axis of the ring when installed in operating position.

The resilient retaining ring of my present invention constitutes an improvement over the prior art retaining rings known to me, in that the ring is dished at an angle to its axis that is less than 25° and preferably does not exceed 18° and that is, therefore, such as to facilitate the mounting of the ring in the external groove of a shaft, if the ring is an external type of ring, or the mounting of the ring in an internal groove in the bore of a sleeve or the like, if the ring is an internal type ring. In either case, the placement of the ring in its groove can be accomplished without the need of special tools. The expansion or contraction of the inner diameter of the ring during mounting is accommodated by slippage of the coils relative to each other and a concomitant expansion or contraction of the ring both radially and circumferentially. Also, as a feature of my invention, the groove into which the retainer ring is to be slipped is formed with a beveled wall that slopes toward the retained part and that enables the ring to be inserted into the groove without changing the angle to which the ring has been initially dished.

It is therefore an important object of my invention to provide a one-piece, integrally formed, resilient retaining ring of improved construction that facilitates the installation of the ring in place and that lends itself to economical manufacture.

It is a further important object of this invention to provide an improved resilient retaining ring for mounting in a shaft groove having a beveled wall that facilitates the mounting of said ring in the groove without the use of special tools and without changing the angle to which the ring is dished.

Another important object of this invention is to provide a conically dished, resilient retaining ring that in operation provides a continuous, substantially 360° contact between the retaining ring, the retained part and a wall of the groove in which the ring is mounted, the amount of tolerance or axial distance between the retained part and the groove being easily compensated for by varying the radial wall height and/or the mount of dish imparted to the ring during its manufacture.

It is a further important object of this invention to provide a unitary resilient retaining ring comprising a plurality of coils of ribbon-like, strip material of the desired elastic and other physical properties, such that by varying the number of turns or the thickness of the strip material, the spring rate of the retaining ring can be easily adjusted.

Other and further important objects of the present invention will become apparent from the following description of the drawings, in which:

FIGURE 1 is a plan view of a resilient retaining ring embodying my invention, when in its normal, unflexed state;

FIGURE 2 is an end, or edge view, of the ring of FIG. 1;

FIGURE 3 is an enlarged, broken, sectional view taken substantially along the line III—III of FIG. 1;

FIGURE 4 is a fragmentary top plan view of the grooved end of a shaft, wherein one wall of the groove is beveled for facilitating the mounting in place of the resilient retaining ring of my invention; and FIGURE 5 is a side elevational view, with parts in section and parts broken away, of an assembly of my resilient retaining ring with a grooved shaft and a member to be retained, illustrating the operative relationship of the parts of the assembly.

As shown on the drawings:

The reference numeral 10 indicates generally a resilient retaining ring of the external type, embodying the principles of my invention. An internal ring would be similar but so formed as to permit easy contraction, rather than expansion. The ring 10 is formed of a plurality of coils, such as the two coils 11 and 12, of an integral, flat strip of suitable material having the necessary elastic and other physical properties. While only two coils or turns, have been shown, a greater number of coils may be employed if desired. The material from which the ring is made is suitably a spring steel capable of withstanding the stresses to which it may be subjected in installation and use. Initially, the material is in the form of a metal strip of uniform width and thickness that is relatively wide and flat. An offset portion 13 is provided in the strip, which, when the strip is coiled and dished to a conical shape, connects the annular portions of the strip and permits the coils 11 and 12 to lie with their flat surfaces in face-to-face, abutting relationship. The angle of the dish, represented by the Greek letter phi (FIG. 3), should be an angle between about 5° and 25°, and preferably about 18°, for a purpose that will appear as the description proceeds. A truly frusto-conical shape is thus imparted to the ring 10.

The ends of the strip forming the coils 11 and 12 are indicated by the reference numerals 15 and 16 (FIGS. 1 and 2), which are separated by a distance indicated by the letter G when the ring is in its normal, unflexed state. While not essential, the end 15 is formed more or less radially across the width of the coil 12, while the end 16 of the coil 11 is radial for a short distance from the outer periphery, as at 16a, and then curves gradually backwardly from said radial portion 16a in an arcuate edge 16b. The form of the end 16, as described, facilitates the retention by the ring of its annular form during relative slippage between the coils 11 and 12 as the ring is expanded or contracted during the mounting of the ring 10 in place or during its removal. The width of the radial wall of the ring between the inside diameter D, and the outside diameter $D_2$ is indicated at H (FIG. 1). The neutral diameter of the ring 10 is indicated by the symbol $D_N$.

As shown in FIGS. 4 and 5, a ring such as the ring 10 is adapted to be mounted in an annular groove 21 of a shaft 20. The groove 21 extends peripherally of the shaft and has a right-angled wall 22 and a beveled wall 23. The beveled wall is preferably at an angle to the axis that is substantially the same as the angle to which the ring is dished. A retained member 24, which may be unitary or an assembly of elements, is mounted more or less freely upon the shaft 20 with a degree of relative sliding movement axially therealong that is to be restrained in one direction by the ring 10, viz. to the right as viewed in FIG. 5. Said ring 10 is shown mounted in the groove 21 with its radially inner peripheral edge in abutting relationship, as at 25, with the right-angled wall 22 of said groove, and with the axially inner surface 26 of the coil 12 facing the beveled wall 23 and extending into pressure contact, as at 27, with the front wall 28 of said retained member 24.

As illustrated in FIG. 5, the ring 10 is in its operative, flexed condition, retaining the retained part 24 against further movement toward the right (as viewed). Depending upon the force required to restrain such movement toward the right of the retained member 24, the ring 10 is flexed to a more or less wider angle than the initial angle of the dish, represented by phi. As indicated in FIG. 4, the diameter of the groove 21 is represented by the letter C. The diameter C would normally be somewhat greater than the inside diameter $D_1$ of the ring for an external type ring, as shown, but if the ring were an internal type of ring, the diameter of the internal ring-receiving groove would be somewhat less than the outside diameter $D_2$ of the ring 10, $D_1$ and $D_2$ being the diameter dimensions when the rings are in their normal unflexed condition.

When the ring 10 is in its operative position (FIG. 5), forces may cause a flexing of the coils 11 and 12 to an angle greater than the angle phi and such forces will thus result in a contraction of the inner diameter of the ring 10, such that the radially inner edges of the rings 11 and 12 snugly engage the bottom wall of the groove 21. When mounted as illustrated, the inner coil 12 provides a substantially continuous contact throughout a full 360 degrees as indicated at 27, with the wall 28, while the inner peripheral edge of the outer ring 11 provides abutting contact, as at 25, throughout substantially 360° with the groove wall 25.

The provision of the beveled groove wall 23 facilitates the mounting of the ring 10 in the groove, without substantially changing the angle phi of the dish and without the necessity of providing such a wide groove as to permit too much play when the ring is mounted in place. Due to the relatively small angle phi, there is a comparatively little resistance to slippage between the abutting broad faces of the rings 11 and 12, and relatively little resistance to the expansion radially and circumferentially of the rings 11 and 12 as the ring is slipped over the end of the shaft 20.

It is thus a simple matter to mount the ring 10 in place in 21 either by winding the ring into the groove or by using a tapered plug and forcing the ring into place in the groove for removing the ring 10 from the groove 21, a tool, such as a screwdriver, could be used to lift one end of the ring from the groove, after which the ring can easily be spiraled out of the groove.

By maintaining the free gap dimension G (FIG. 1), at a figure that is equal to or greater than the amount that is obtained by multiplying the ring neutral diameter $D_N$ by 0.51, undesirable flexing of the ring ends is minimized.

Also, by working within the following limitations, an external or internal ring is developed which will not spiral itself from the groove under repeated deflections:

(A) Angle of dish, phi, approximately 18°; but not more than 25° or less than 5°;

(B) Installed ring stresses must be between 30,000 and 60,000 p.s.i., as determined by the equations:

For an external ring: $P/(1+P)=SD_N/EH$; for an internal ring: $P/(1-P)=SD_N/EH$ where:

$P$=Percent change in diameter from free state to installed state.
$D_N$=Neutral ring diameter.
$H$=Effective width of the radial wall, $D_2-D_1$.
$S$=Installed ring stress.

(C) Maximum ring stresses when the ring is in flattened, or flexed position must not exceed 220,000 p.s.i., as determined by the formulae:

For an external ring:

$$\phi=114.6\left[\frac{\sigma-\frac{PEH}{(1+P)D_N}}{EH}\right]C$$

For an internal ring:

$$\phi=114.6\left[\frac{\sigma+\frac{PEH}{(1-P)D_N}}{ET}\right]C$$

where:

$\phi$=Angle of dish in degrees.
$\sigma$=Stress in flattened position.
$P$=Percent change in ring neutral diameter, from free state to installed state.
$E$=Modulus of elasticity.
$H$=Effective width of the radial wall, $D_2-D_1$.
$C$=Groove diameter/2.
$T$=Thickness of material in each leaf.

Although my invention has been specifically disclosed as an external ring for use with a shaft having an external annular groove, it will be appreciated from the foregoing description that my invention includes an internal ring for use where the retained or retaining part has a bore with an internal annular groove, and in that case the groove should also have a beveled wall sloping toward the other part, and the other part may be provided with an annular groove having right-angled walls, or a right-angled shoulder or other abutment.

It will be understood that modifications and variations may be effected without departing from the scope of the novel concepts of the present invention.

I claim:

1. In combination,
   a shaft having an annular groove provided with a beveled wall and a right angle wall,
   a retained part mounted on said shaft with limited freedom of sliding movement therealong, and a one-piece resilient retaining ring removably positioned in said groove against said right angle wall to abut the same through approximately 360°,
      said retaining ring comprising a plurality of coils of flat ribbon-like material having a gap between the ends thereof and an integral connecting portion lying within said gap,
      said coils having flat contacting surfaces except at said gap for free slippage at the coils relative to each other,
      said gap being at least equal in length to 0.51 times the inner diameter of said coils to minimize flexing of the coil ends,
      said ring being permanently dished at an angle of about 18° and inclined in the same direction as said beveled wall to provide substantially 360° contact with said retained part.

2. In combination with relatively axially movable members, one of which has a groove, which members are to be retained against such relative axial movement,
   a resilient retaining ring secured in said groove in abutting relation to a wall of said groove through approximately 360°, said groove in said one member having a bevelled wall sloping toward said other member and said ring lying against said bevelled wall, said ring comprising a plurality of coils of flat ribbon-like material having a gap between the ends thereof and integral connecting portion lying within said gap, said coils being dished at an angle not greater than 25° nor less than 5° to the axis of said coils, said coils having flat contacting faces except at said gap for free slippage of the coils relative to each other, said gap being at least equal in length to 0.51 times the inner diameter of said coils to minimize flexing of the coiled ends.

3. In combination as defined by claim 2, wherein the angle of said bevelled wall is substantially the same as the angle of dish of said coils in their normal state when not flexed.

References Cited by the Examiner

UNITED STATES PATENTS

| 955,160 | 4/1910 | Holmes | 85—36 |
| 1,175,550 | 3/1916 | Murray | 85—5.5 |
| 1,213,509 | 1/1917 | Lee | 287—53 |
| 2,450,425 | 10/1948 | Frisby | 85—8.8 |
| 2,544,631 | 3/1951 | Heiman et al. | 85—8.8 |
| 2,660,913 | 12/1953 | Frisby | 85—8.8 |

CARL W. TOMLIN, *Primary Examiner.*

R. S. BRITTS, *Assistant Examiner.*